United States Patent Office 3,392,508
Patented July 16, 1968

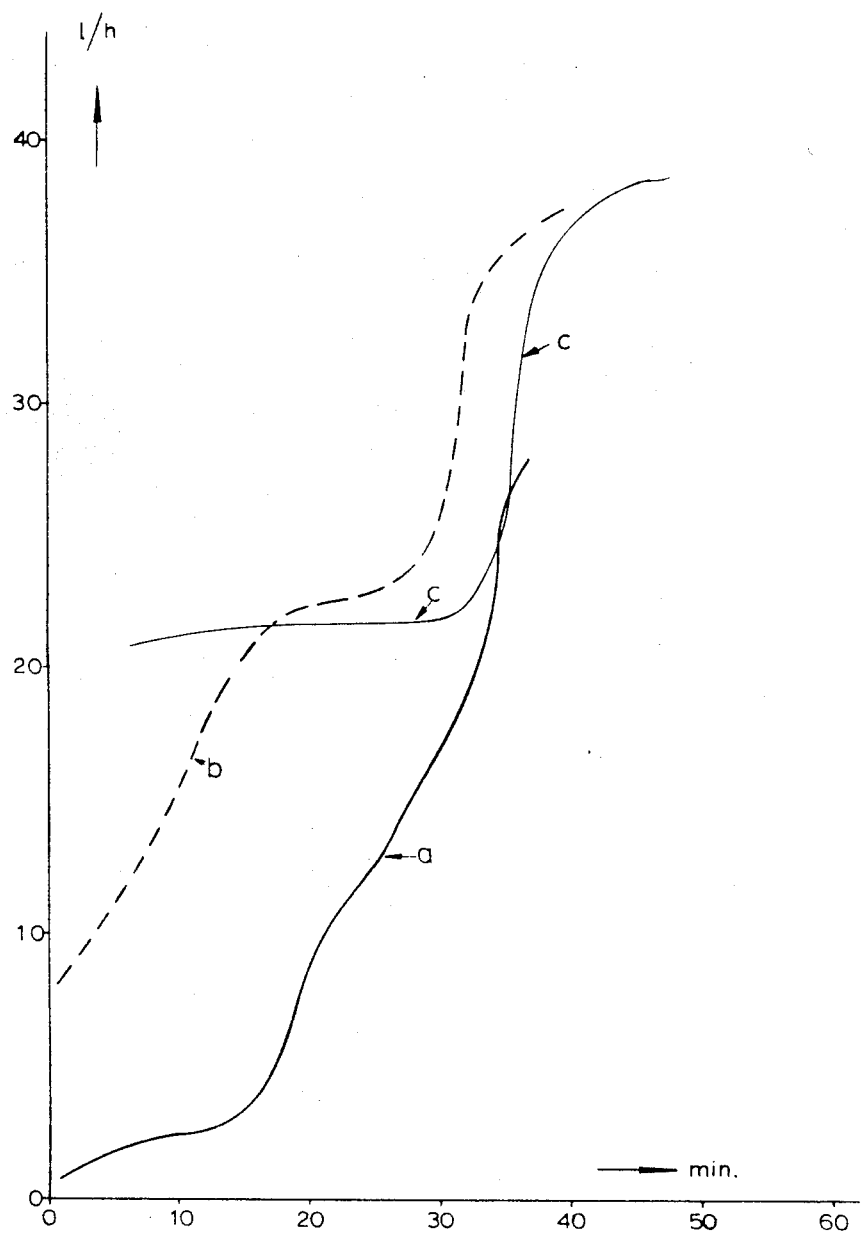

3,392,508
PRETREATMENT OF MOLECULAR SIEVES
Joseph J. F. Scholten, Sittard, and Josef A. Konvalinka, Geleen, Netherlands, assignors to Stamicarbon N.V., Heerlen, Netherlands
Filed Dec. 13, 1966, Ser. No. 601,410
Claims priority, application Netherlands, Dec. 13, 1965, 6516208
7 Claims. (Cl. 55—75)

ABSTRACT OF THE DISCLOSURE

A process is described to deactivate or poison the active polymerization-inducing sites on the surface of zeolitic molecular sieves, wherein the zeolite is first treated with hydrogen sulfide, a lower alkyl mercaptan or di(lower alkyl) sulfides, and then desorbed with an inert gas at a temperature between about 200°–700° C.

*Background and summary of the invention*

The present invention relates to a pretreatment of molecular sieves in order to render them more suitable for use in separation and catalytic processes. Such separation processes include the drying of gases, the removal by adsorption of normal hydrocarbons from a mixture of normal and branched hydrocarbons (this separation being based on a difference in molecular diameter), and separations of mixtures by means of preferential adsorption. In the catalytic processes the pretreated molecular sieve is used as a carrier of catalytically active material e.g. Pt, Pd, Cu, Ni. As is commonly known, molecular sieves include certain natural and synthetic zeolites which are crystalline aluminosilicates of various metals such as Na, K, Ca, Ba, and all artificial zeolites such as Linde-Union Carbide molecular sieves Types, A, X and Y. By dehydration of the zeolite, uniform adsorption cavities are formed which are accessible through pores of characteristic diameters which may vary widely from type to type, e.g., from about 3 to about 10 A., depending on the type of sieve.

It is furthermore commonly known that the surface of zeolitic aluminosilicates has certain active sites which exhibit a promoting effect on polymerization reactions, of polymerizable substances, e.g., olefines and di-olefines. As a result, when the zeolite comes into contact with gas mixtures containing such polymerizable substances, the adsorption capacity of the zeolite is adversely affected apparently on account of polymer deposition, and/or undesired polymerization takes place.

It has already been proposed to inhibit or poison such active sites by introduction of certain inhibitor compounds, such as, e.g., ammonia, volatile amines (with a molecular weight of below about 100), or liquid organic nitrogen bases, such as quinoline. However, the disadvantage of poisoning the active sites with $NH_3$ or volatile amines is that the effect is only temporary. After a period of time, the poisoning effect is exhausted so that the zeolite either has to be periodically re-treated with inhibitor compound, or the inhibitor has to be periodically or continuously fed to the separation process system. On the other hand, when the liquid nitrogen bases are used as inhibitors, there is the disadvantage that the loading and desorption of the zeolites becomes a laborious process.

It has now been found that the active sites on the surface of molecular sieves of zeolitic origin where polymerization may occur can be essentially permanently poisoned (against inducing the polymerization of olefinic monomers) by a treatment wherein a sulphur compound of the group composed of hydrogen sulphide, lower alkyl mercaptans with about 1–5 carbon atoms, and dialkyl sulphides with about 2–6 carbon atoms, is loaded onto the zeolite, followed by a desorption thereof in a flow of gas at a temperature (about 200–700° C.) commonly used for the regeneration of molecular sieves. It has now been observed that desorption at the elevated temperature is apparently incomplete. Presumably a chemical reaction takes place with the sulphur compound on the surface of the molecular sieves, indicated by a permanent increase in weight of the order of 0.1–1%, calculated on the original weight of the molecular sieves, and typically the sieve takes on moreover a faint blue coloration. The rate of desorption naturally depends on the temperature. Below about 200° C., the desorption is particularly slow, and above about 700° C., the crystal structure of the molecular sieve is adversely affected, rendering the sieve unsuitable for adsorptive separation purposes. Accordingly, the temperature that can be used for the desorption step is in the range between about 200° and 700° C. for instance, a satisfactory desorption in a flow of nitrogen is obtained at a temperature of 300° C. after 10–16 hours, a sufficient amount of inhibitor then being retained, in one form or another, on the zeolitic molecular sieves to inactivate the polymerization promoting sites, without, however, reducing the adsorption capacity to any significant extent. The poisoning of the sites on the surface of the molecular sieve that promote polymerization is thus carried out according to the invention by means of sulphur compounds that have a comparatively low molecular weight (about 100 or lower). Compounds of higher molecular weights are of a molecular size such that the molecule cannot penetrate into the cavities of the molecular sieve.

This invention will be further understood with reference to the following experiments in which a dry gas mixture composed of 2.2% by volume of isobutane, 56.4% by volume of isobutene, 9.2% by volume of n-butane, and 32.4% by volume of n-butenes was passed through a column packed with 400 cm.$^3$ of a calcium-sodium aluminosilicate zeolite, having a pore diameter of about 5 A., and wherein it is desired to separate the n-$C_4$-hydrocarbons and iso-$C_4$-hydrocarbons. In these experiments, the absolute adsorption pressure was 1 atm., the adsorption temperature 70° C. and the load on the column 40 liters of gas (N.T.P.) per hour, which corresponds to 0.4 kg. of $C_4$-hydrocarbons per kg. of molecular sieves per hour. The adsorbed gases were desorbed at 300° C. by means of a flow of nitrogen. The desorbed gases were cooled, the polymerizate being condensed to a liquid, separated off, and weighed.

The experiments were carried out with activated molecular sieves which were not otherwise treated, with molecular sieves that were previously loaded with hydrogen sulphide, methyl mercaptan or dimethyl sulphide, and with molecular sieves that, according to the invention, were previously loaded with hydrogen sulphide, methyl mercaptain or dimethyl sulphide and subsequently subjected to the desorption process to remove the adsorbed sulphur compound. In the loading and desorption of the deactivating agent, the adsorption temperature was also 70° C. and the desorption temperature 300° C. The working conditions and the results are summarized in the following table annexed.

Break-through curves based on the measurements obtained from these experiments are given in the attached sheet of drawings, where the adsorption time, in minutes, is plotted on the abscissa and the amount of not absorbed $C_4$-hydrocarbons, in litres (N.T.P.) per hour, on the ordinate. Break-through curve *a* relates to the adsorption of untreated molecular sieves (blank), curve *b* relates to the conditions of Experiment 5, and curve *c* is typical of the conditions of the experiments carried out with molecular sieves treated according to the invention (Experiments 3, 4, 7, 8, 9, 10 and 11). Experiments 8, 9 and 11 are repetitions of separations carried out with the molecular sieves used in Experiments 7 and 10 without these having been retreated with inhibitor. It will be seen that even after ten repetitions the polymerization of the unsaturated hydrocarbons appeared to be suppressed to the same degree by the single treatment with hydrogen sulphide or the mercaptans according to this invention.

In blank Experiment No. 1, a large part of the iso-$C_4$-hydrocarbons was polymerized, as a result of which the adsorption capacity for n-$C_4$-hydrocarbons was strongly reduced and a break-through of n-$C_4$-hydrocarbons was observed after only about 14 minutes. If use is then made of the molecular sieve that has been poisoned or deactivated with methyl mercaptan, but from which the excess methyl mercaptan has not been removed by desorption, at first a rather extensive polymerization of iso-$C_4$-hydrocarbons takes place (first oblique part of curve $b$), and then iso-$C_4$-hydrocarbons are allowed to pass through, while n-$C_4$-hydrocarbons are adsorbed until the break-through point is reached after about 30 minutes. However, the experimental results and break-through curves show further that, when use is made of the molecular sieve treated according to the invention, polymerization, if any, is largely suppressed, and a sharp separation is effected between iso-$C_4$-hydrocarbons passing through directly and n-$C_4$-hydrocarbons that are first adsorbed by the molecular sieve (curve $c$).

These results are clearly superior to those obtained with the process which was not according to this invention.

ing generally well known to those skilled in the art, and typically using any convenient inert gas (nitrogen being preferred).

Accordingly, this invention is limited only by the spirit and scope of the following claims.

What is claimed is:

1. In processes for treating a gaseous stream containing olefinically unsaturated lower aliphatic hydrocarbons with zeolitic molecular sieves, the improvement whereby the olefinic polymerization-inducing activity of said sieves is inhibited, consisting essentially in contacting the said zeolitic molecular sieve with at least one sulphur compound selected from the class consisting of hydrogen sulphide, alkyl mercaptans having from about 1 to 5 carbon atoms and alkyl sulphides having from about 2 to 6 carbon atoms to adsorb said sulphur compound on said sieve, and subsequently thereafter desorbing the loaded sieve at a temperature in the range of about 200–700° C., whereby a molecular sieve is obtained having substantially suppressed activity with respect to catalyzation of olefinic polymerization reactions and contacting said gaseous stream with said pretreated zeolitic molecular sieves.

2. The process of claim 1 wherein said sulphur compound is hydrogen sulphide.

3. The process of claim 1 wherein said sulphur compound is methyl mercaptan.

4. The process of claim 1 wherein said sulphur compound is dimethyl sulphide.

5. The process of claim 1 wherein said loaded sieve is desorbed utilizing a stream of nitrogen gas.

| Experiment No. | Pretreatment With Inhibitor | | | | | Separation of $C_4$-Hydrocarbon Mixture | | | | |
|---|---|---|---|---|---|---|---|---|---|---|
| | Inhibitor | Adsorption temperature, °C. | Load after adsorption percent by weight | Desorption temperature, °C. | Increase in weight after desorption, percent by weight | Break-through time of n-$C_4$-hydrocarbon, minutes | Amount of n-$C_4$-hydrocarbons adsorbed, percent by weight | Polymer formed with reference to total feed of gas mixture, percent by weight | Purity iso-$C_4$-hydrocarbon, percent | Purity n-$C_4$-hydrocarbon, percent |
| 1 | Blank | | | | | 14 | 14.3 | 20.5 | 98 | 97 |
| 2 | Hydrogen sulphide | 70 | 3.0 | | | | | 20 | | |
| 3 | do | 70 | 1.8 | 300 | 0.1 | 33 | 10.0 | 1.6 | 98 | 97 |
| 4 | do | 70 | 4.2 | 300 | 0.4 | 33 | 10.2 | 0.9 | 96 | 97 |
| 5 | Methyl mercaptan | 70 | 2.1 | | | 30 | 8 | 2.5 | 98 | 97 |
| 6 | do | 70 | 0.2 | | | 30 | 10 | 5.0 | 98 | 97 |
| 7 | do | 70 | 2.4 | 300 | 1.2 | 33 | 8 | 0.3 | 98 | 97 |
| 8 | do | 70 | 2.4 | 300 | 1.1 | 33 | 8 | 0.3 | 98 | 97 |
| 9 | do | 70 | 2.4 | 300 | 1.1 | 33 | 8 | 0.2 | 98 | 97 |
| 10 | Dimethyl sulphide | 20 | 2.0 | 300 | 0.9 | 32 | 11.0 | 0.1 | 98 | 97 |
| 11 | do | 20 | 2.0 | 300 | 0.9 | 32 | 11.0 | 0.1 | 98 | 98 |

It will be understood that the results set forth in the above examples are typical of the present invention, but that the present invention may be practiced with other zeolitic molecular sieves such as described by T. L. Thomas in Proc. of the Sixth World Petroleum Congress, June 1963, section III, pp. 115–129. Further, other sulphur compounds may be used as the inhibitor compound within the limits defined generally hereinabove, and as set forth in the following claims. Further, the inhibition of olefinic polymerization reactions is observed generally with olefinically unsaturated lower aliphatic hydrocarbons. Moreover, gases other than nitrogen may be employed in the desorption step, desorption procedures be- 6. The process of claim 1 wherein said molecular sieve is a crystalline aluminosilicate.

7. The process of claim 6 wherein said molecular sieve is a calcium-sodium aluminosilicate.

References Cited

UNITED STATES PATENTS 3,061,654  10/1962  Genshe et al. _____ 260—676
3,106,593  10/1963  Benes et al. _____ 55—75

REUBEN FRIEDMAN, *Primary Examiner.*

C. N. HART, *Assistant Examiner.*